US009129653B2

(12) United States Patent
Yang et al.

(10) Patent No.: US 9,129,653 B2
(45) Date of Patent: Sep. 8, 2015

(54) SYSTEMS AND METHODS FOR CALIBRATION COASTING IN A DATA PROCESSING SYSTEM

(75) Inventors: Shaohua Yang, Santa Clara, CA (US); Weijun Tan, Longmont, CO (US); Jefferson Singlelon, Westminster, CO (US); Xuebin Wu, San Jose, CA (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 702 days.

(21) Appl. No.: 13/452,722

(22) Filed: Apr. 20, 2012

(65) Prior Publication Data

US 2013/0283107 A1    Oct. 24, 2013

(51) Int. Cl.
G01B 5/28 (2006.01)
G11B 20/18 (2006.01)

(52) U.S. Cl.
CPC .......... *G11B 20/18* (2013.01); *G11B 2020/183* (2013.01); *G11B 2020/185* (2013.01); *G11B 2020/1823* (2013.01); *G11B 2220/2516* (2013.01)

(58) Field of Classification Search
CPC .................................. G01B 5/28; G11B 20/18
USPC ........................................................ 702/35
See application file for complete search history.

(56) References Cited

U.S. PATENT DOCUMENTS

| 5,802,069 | A | 9/1998 | Coulson |
| 6,065,149 | A | 5/2000 | Yamanaka |
| 6,301,679 | B1 | 10/2001 | Tan |
| 6,446,236 | B1 | 9/2002 | McEwen et al. |
| 6,557,113 | B1 | 4/2003 | Wallentine |
| 6,691,263 | B2 | 2/2004 | Vasic et al. |
| 6,697,977 | B2 | 2/2004 | Ozaki |
| 6,731,442 | B2 | 5/2004 | Jin et al. |

(Continued)

FOREIGN PATENT DOCUMENTS

| EP | 0549151 | 6/1993 |
| EP | 1096491 | 10/2005 |

(Continued)

OTHER PUBLICATIONS

Bagul, Y.,G.: "Assessment of current health and remaining useful life of hard disk drives" [online] Jan. 1, 2009 [retrieved on Oct. 14, 2010] Retrieved from the internet:<URL;htt.

(Continued)

*Primary Examiner* — Tung S Lau
*Assistant Examiner* — Xiuquin Sun
(74) *Attorney, Agent, or Firm* — Hamilton DeSanctis & Cha

(57) ABSTRACT

The present inventions are related to systems and methods for data processing, and more particularly to systems and methods for coasting one or more calibration loops based upon identification of a probability of data inaccuracies. One embodiment is a data processing system that includes: a defect detector circuit operable to identify a defect region during a first pass processing of a received data set; a defect location buffer operable to maintain an indication of the defect region in the received data set; and a calibration circuit operable to adaptively update a calibration output during a second pass processing of the received data set, where updating the calibration output is disabled for one or more samples of the received data set corresponding to the indication of the defect region.

19 Claims, 4 Drawing Sheets

(56) References Cited

U.S. PATENT DOCUMENTS

| | | |
|---|---|---|
| 6,738,948 B2 | 5/2004 | Buckley et al. |
| 6,980,382 B2 | 12/2005 | Hirano et al. |
| 7,154,936 B2 | 12/2006 | Bjerke et al. |
| 7,168,030 B2 | 1/2007 | Ariyoshi |
| 7,203,015 B2 | 4/2007 | Sakai et al. |
| 7,237,173 B2 | 6/2007 | Morita et al. |
| 7,254,192 B2 | 8/2007 | Onggosanusi |
| 7,257,172 B2 | 8/2007 | Okamoto et al. |
| 7,359,313 B2 | 4/2008 | Chan et al. |
| 7,441,174 B2 | 10/2008 | Li et al. |
| 7,457,212 B2 | 11/2008 | Oh |
| 7,652,966 B2 | 1/2010 | Kadokawa |
| 7,688,915 B2 | 3/2010 | Tanrikulu et al. |
| 7,702,973 B2 | 4/2010 | Mead |
| 7,849,385 B2 | 12/2010 | Tan |
| 7,852,722 B2 | 12/2010 | Kikugawa et al. |
| 7,924,518 B2 | 4/2011 | Mathew |
| 7,952,824 B2 | 5/2011 | Dziak |
| 8,095,855 B2 | 1/2012 | Tan |
| 8,121,224 B2 | 2/2012 | Tan |
| 8,139,457 B2 | 3/2012 | Cao |
| 8,149,527 B2 | 4/2012 | Tan |
| 8,161,357 B2 | 4/2012 | Tan |
| 8,176,400 B2 | 5/2012 | Tan |
| 8,190,831 B2 | 5/2012 | Lee et al. |
| 8,201,051 B2 | 6/2012 | Tan |
| 8,219,892 B2 | 7/2012 | Tan |
| 2002/0041459 A1 | 4/2002 | Singer |
| 2003/0043487 A1 | 3/2003 | Morita et al. |
| 2003/0147172 A1 | 8/2003 | Singer et al. |
| 2007/0061687 A1 | 3/2007 | Hwang |
| 2008/0165646 A1* | 7/2008 | Tung et al. ............ 369/53.17 |
| 2010/0042877 A1 | 2/2010 | Tan |
| 2010/0229031 A1 | 9/2010 | Tan |
| 2010/0268996 A1 | 10/2010 | Yang |
| 2010/0269023 A1 | 10/2010 | Yang |
| 2011/0205653 A1 | 8/2011 | Mathew |
| 2011/0209026 A1 | 8/2011 | Xia |
| 2012/0087033 A1 | 4/2012 | Yang |
| 2012/0266055 A1 | 10/2012 | Zhang |

FOREIGN PATENT DOCUMENTS

| | | |
|---|---|---|
| JP | 10-145243 | 5/1998 |
| JP | 2007-087529 | 4/2007 |
| WO | WO 01/39188 | 5/2001 |

OTHER PUBLICATIONS

ECMA: Standardizing Information and Communication Systems: "Standard ECMA-272: 120 mm DVD Rewritable Disk (DVD-RAM)" Standard ECMA, No. 272, Feb. 1, 1998 pp. 43-51.

Galbraith et al, "Iterative Detection Read Channel Technology in Hard Disk Drives" [online] Oct. 1, 2008 [ret. on Oct. 1, 2008] Ret. from Internet<URL:http://www.hitachigst.com.

Kavcic et al., "A Signal-Dependent Autoregressive Channel Model", IEEE Transactions on Magnetics, vol. 35, No. 5, Sep. 1999 pp. 2316-2318.

U.S. Appl. No. 13/213,789, Unpublished (filed Aug. 19, 2011) (Ming Jin).

U.S. Appl. No. 13/368,599, Unpublished (filed Feb. 8, 2012) (Yang Cao).

* cited by examiner

SYSTEMS AND METHODS FOR CALIBRATION COASTING IN A DATA PROCESSING SYSTEM

BACKGROUND OF THE INVENTION

The present inventions are related to systems and methods for data processing, and more particularly to systems and methods for calibration during data processing.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function receives data sets and applies a data detection algorithm and a data decode algorithm to the data sets to recover an originally written data set. In some cases, media or other defects are encountered that make recovering the originally written data difficult if not impossible.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for calibration during data processing.

Various embodiments of the present invention provide data processing systems that include: a defect detector circuit, a defect location buffer, and a calibration circuit. The defect detector circuit is operable to identify a defect region during a first pass processing of a received data set. The defect location buffer is operable to maintain an indication of the defect region in the received data set. The calibration circuit is operable to adaptively update a calibration output during a second pass processing of the received data set. Updating the calibration output is disabled for one or more samples of the received data set corresponding to the indication of the defect region. In some instances of the aforementioned embodiments, the system is implemented as an integrated circuit. In one or more instances of the aforementioned embodiments, the data processing system is incorporated in a storage device, while in other instances it is incorporated in a data communication device.

In various instances of the aforementioned embodiments, the data processing system further includes a data detector circuit. This data detector circuit may be, but is not limited to, a maximum a posteriori data detector circuit, or a Viterbi algorithm data detector circuit. The data detector circuit is operable to: apply a data detection algorithm to a detector input derived from the received data set during a first pass processing of the received data set to yield a first detected output; and apply the data detection algorithm to a detector input derived from the received data set during a second pass processing of the received data set to yield a second detected output. Applying the data detection algorithm is based at least in part on the calibration output. In some such instances, the data detector circuit includes a noise predictive filter, and the calibration output is a filter tap used by the noise predictive filter.

In various of the aforementioned instances, the data processing system further includes an equalizer circuit. The equalizer circuit is operable to: equalize an equalizer input derived from the received data set during a first pass processing of the received data set to yield a first equalized output; and equalize an equalizer input derived from the received data set during a second pass processing of the received data set to yield a second equalized output. The equalizing is based at least in part on the calibration output. In some cases, the equalizer circuit is a digital finite impulse response filter circuit, and the calibration output is a filter coefficient used by the digital finite impulse response filter.

In some cases, the first pass processing of the received data set uses a first data set derived from reading a location on a storage medium, and the second pass processing of the data set uses a second data set derived from reading the location of the storage medium. In other cases, the first pass processing of the received data set uses a transferred data set received via a transmission medium and stored as a stored data set to a buffer, and the second pass processing of the data set uses the stored data set. In various instances of the aforementioned embodiments, the defect detector circuit is a media defect detector circuit, and the defect region corresponds to a defective portion of a medium from which the received data set is derived.

Other embodiments of the present invention provide methods for data processing that include: accessing a data set from a source to yield an accessed data set; updating a calibration output based on at least a portion of a series of samples derived from the accessed data set; detecting a portion of the accessed data set that exhibits a probability of inaccuracy; storing an indication of the probability of inaccuracy; re-accessing the data set from the source to yield a re-accessed data set; and updating the calibration output based on at least a portion of a series of samples derived from the re-accessed data set. Updating the calibration output is disabled for one or more samples of the re-accessed data set corresponding to the indication of the probability of inaccuracy.

In various instances of the aforementioned embodiments, the source is a storage medium, and detecting the portion of the accessed data set that exhibits a probability of inaccuracy is done by a media defect detector. In such instances, the portion of the accessed data set that exhibits the probability of inaccuracy corresponds to a defective region on the storage medium. In one or more instances of the aforementioned embodiments, the methods further include: applying a data detection algorithm to a detector input derived from the accessed data set to yield a first detected output; and applying the data detection algorithm to a detector input derived from the re-accessed data set to yield a second detected output. Applying the data detection algorithm is based at least in part on the calibration output. In some cases, the data detector circuit includes a noise predictive filter, and the calibration output is a filter tap used by the noise predictive filter. In some cases, the methods further include: equalizing an equalizer input derived from the accessed data set to yield a first equalized output, and equalizing an equalizer input derived from the re-accessed data set to yield a second equalized output. In such cases, the detector input derived from the accessed data set is derived from the first equalized output, and the detector input derived from the accessed data set is derived from a combination of the first equalized output and the second equalized output. The equalizing is based at least in part on the calibration output.

Yet other embodiments of the present invention provide storage devices that include: a storage medium, a head assembly, and a data processing circuit. The head assembly is disposed in relation to the storage medium and is operable to provide an input signal corresponding to information on the storage medium. The data processing circuit includes: a front end processing circuit, a media defect detector circuit, a defect location buffer, and a calibration circuit. The front end processing circuit is operable to process the input signal to yield a first data set from a location on the storage medium and to yield a second data set from the same location. The second data set is a re-accessed version of the first data set. The media defect detector circuit is operable to identify a defective region on the storage medium based upon the first data set, and the defect location buffer is operable to maintain an indication of a probability of inaccuracy in a portion of the first data set corresponding to the defective region on the storage medium. The calibration circuit is operable to adaptively update a first calibration output and a second calibration output using the second data set. Updating the first calibration output and the second calibration output is disabled for one or more samples of the second data set corresponding to the indication of a probability of inaccuracy.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for calibration during data processing.

Various embodiments of the present invention provide for data processing systems that include calibration circuitry and media defect detection circuitry. When the media defect detection circuitry identifies a period of error during data processing, the state of the calibration circuitry is maintained static to avoid undermining the calibration outputs with data that is known to be suspect. Updating the calibration outputs by the media defect detection circuitry resumes once the period of media defect is passed. This process of maintaining the calibration outputs static during periods of suspect data inputs is referred to herein generally as "coasting".

Figure 1:
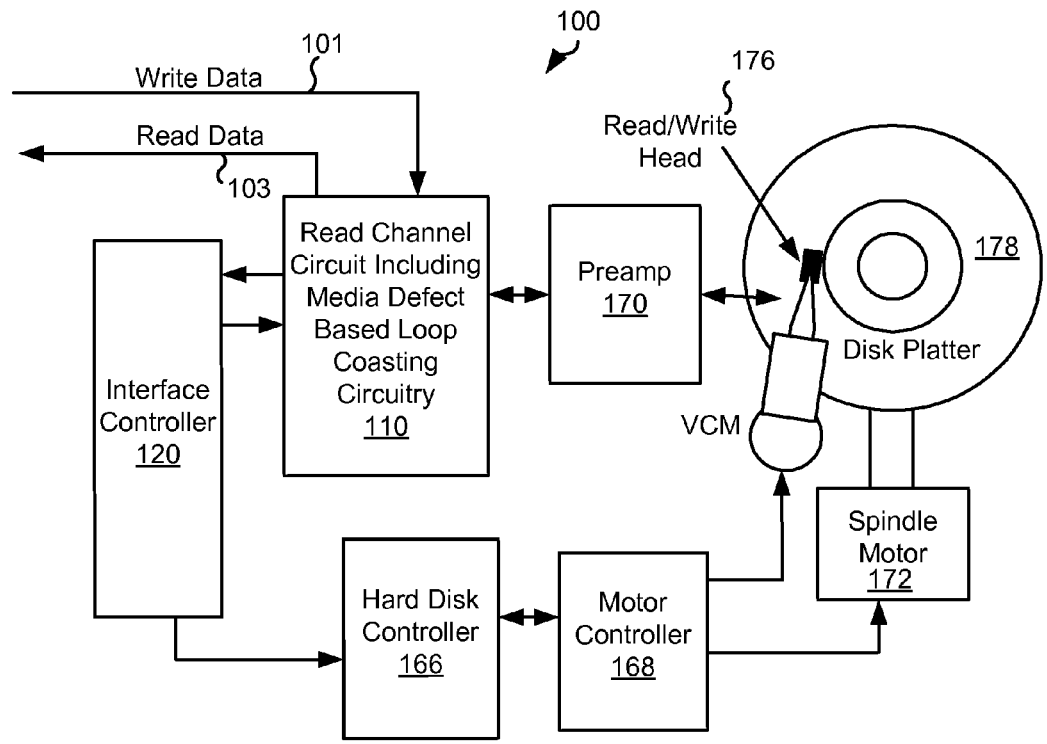
FIG. 1 shows a storage system including media defect based loop coasting circuitry in accordance with various embodiments of the present invention.

Turning to FIG. 1, a storage system 100 including a read channel circuit 110 having media defect based loop coasting circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103.

As part of processing data accessed from disk platter 178, read channel circuit 110 performs a media defect detection process operable to determine whether received data is associated with a defective region of disk platter 178 or includes other indications that the received data has somehow been compromised. When compromised data is indicated, a defect flag is asserted. The timing of this media defect flag relative to the stream of received data is stored, and during subsequent accesses to the same received data during, for example, a re-read of disk platter 178 or a re-use of buffered data previously read from disk platter 178, one or more calibration values used internal to read channel circuit 110 are maintained static. In some cases, read channel circuit 110 may include a data processing circuit similar to that discussed below in relation to FIG. 3, and/or may apply data processing similar to that discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 2:
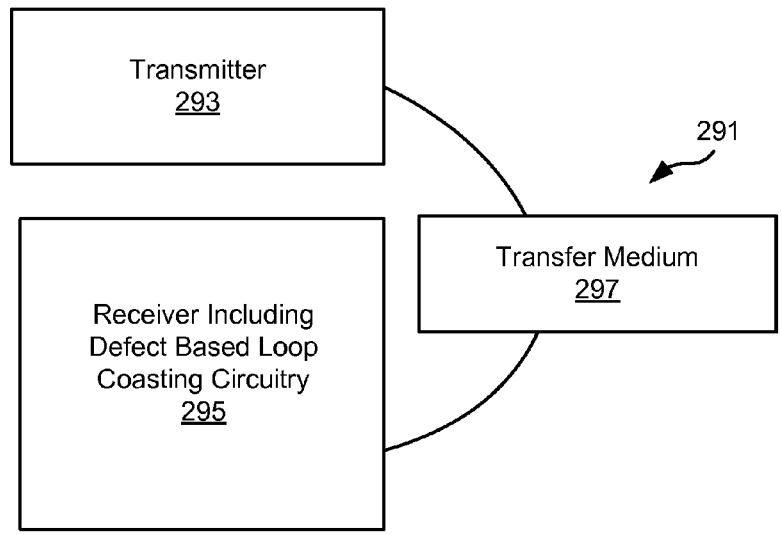
FIG. 2 depicts a data transmission system including defect based loop coasting circuitry in accordance with one or more embodiments of the present invention.

Turning to FIG. 2, a data transmission system 291 including a receiver 295 having defect based loop coasting circuitry is shown in accordance with various embodiments of the present invention. Data transmission system 291 includes a transmitter 293 that is operable to transmit encoded information via a transfer medium 297 as is known in the art. The encoded information is received from transfer medium 297 by a receiver 295. Receiver 295 processes a received input representing the encoded information to yield the originally transmitted data.

As part of processing data received by receiver 295, a processing circuit performs a defect detection process operable to determine whether received data is associated with an unreasonable noise level over transfer medium 297 or includes other indications that the received data has somehow been compromised. When compromised data is indicated, a defect flag is asserted. The timing of this media defect flag relative to the stream of received data is stored, and during subsequent accesses to re-use of buffered data previously received via transfer medium 297, one or more calibration values used internal to the processing circuit are maintained static. In some cases, the processing circuit may include a data processing circuit similar to that discussed below in relation to FIG. 3, and/or may apply data processing similar to that discussed below in relation to FIGS. 4a-4b.

Figure 3:
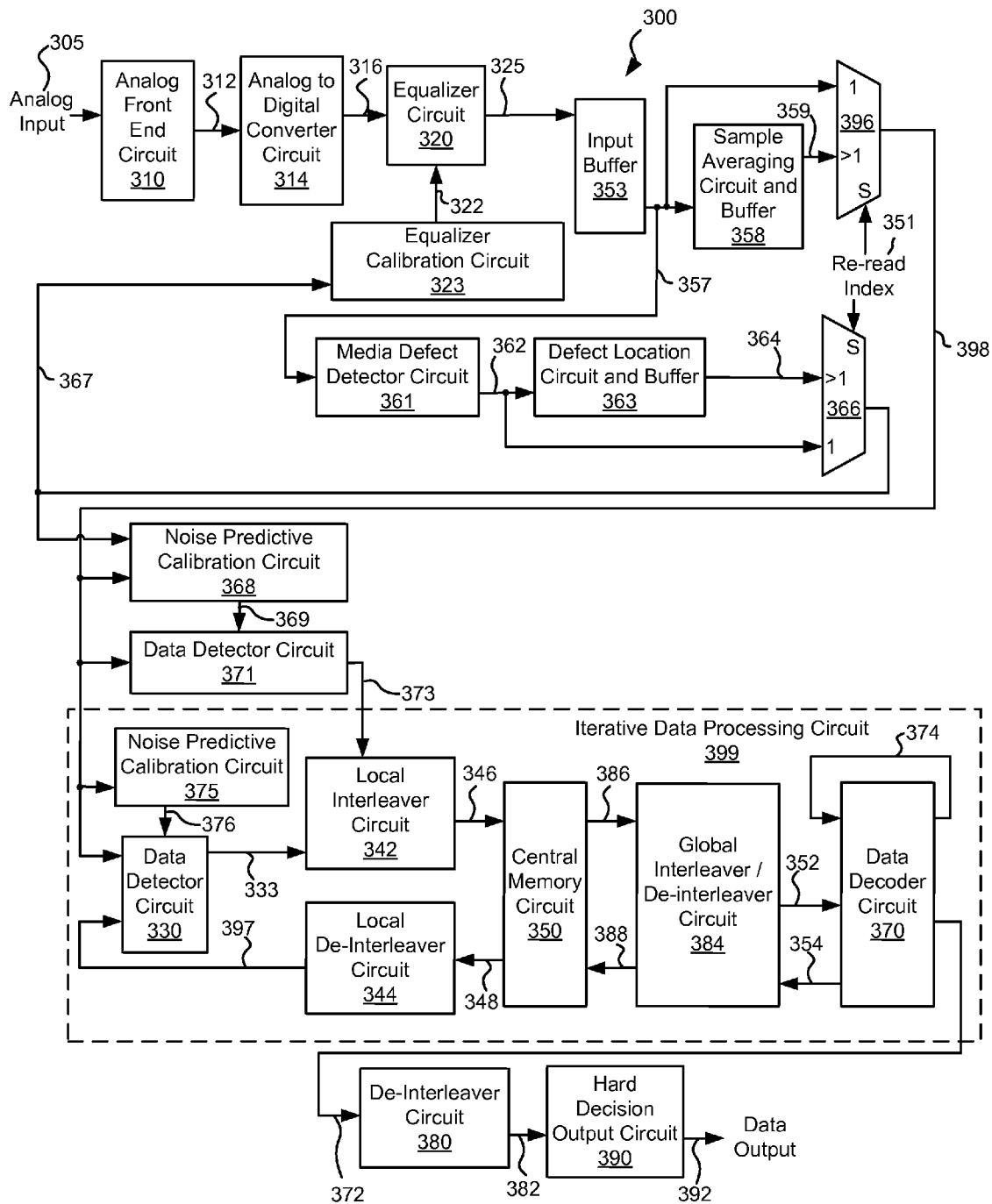
FIG. 3 shows a data processing circuit operable including media defect based loop coasting circuitry in accordance with some embodiments of the present invention.

Turning to FIG. 3, a data processing circuit 300 operable to apply defect based loop coasting in accordance with some embodiments of the present invention. Data decoding circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. The equalization algorithm relies upon filter coefficients 322 from an equalizer calibration circuit 323. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input.

Equalizer calibration circuit 323 may be any circuit known in the art that is capable of adaptively adjusting filter coefficients 322 to improve operation of data processing circuit 300. Based upon the disclosure provided herein, one of ordinary skill in the art will recognize a variety of types of calibration that may be performed in relation to different embodiments of the present invention. Equalizer calibration circuit 323 allows adaptive adjustment of filter coefficients 322 based upon an update enable signal 367. Where update enable signal 367 indicates the occurrence of a defect, adaptive adjustment is disabled. Otherwise, adaptive adjustment is allowed.

Equalized output 325 is stored to an input buffer 353 that includes sufficient memory to maintain one or more codewords until processing of that codeword is completed through a data detector circuit 371 and an iterative data processing circuit 399 (outlined by dashed lines) including, where warranted, multiple global iterations (passes through both a data detector circuit 330 and a data decoder circuit 370) and/or local iterations (passes through multi-level decoder circuit 399 during a given global iteration). An output 357 is provided to a selector circuit 396, a sample averaging circuit and buffer 358, and a media defect detector circuit 361. Sample averaging circuit and buffer 358 is operable to average re-reads from the same region of a medium from which analog front end circuit 310 is derived. Such averaging may be done on a sample by sample basis as is known in the art and operates to average out noise components in the received data sets. An averaged output 359 is provided to selector circuit 396. It should be noted that such sample averaging may be replaced or combined with a number of different noise reduction processes known in the art. Based upon the disclosure provided herein, one of ordinary skill in the art will recognize a variety of noise reductions processes that may be used in relation to different embodiments of the present invention.

During operation, output 357 is selected by selector circuit 396 during a first pass reading the data (i.e., a re-read index 351 is '1') as a processing output 398. For subsequent re-reads during the retry process (i.e., a re-read index 351 is '>1'), averaged output 359 is selected by selector circuit 396 as processing output 398. For the second pass, average output 359 is an average of the first two passes; for the third pass, average output 359 is an average of the first three passed; and similarly for subsequent passes.

Media defect detector circuit 361 may be any circuit known in the art that is capable of identifying portions of a received data set that are less likely to be accurate due to a defect on the medium from which analog front end circuit 310 is derived, or that are less likely to be accurate for other reasons. As just one possible example, media defect detector 361 may be implemented similar to that disclosed in US Pat. Pub. No. 2010/0042877 entitled "Systems and Methods for Media Defect Detection" and filed Aug. 14, 2009 by Tan. The entirety of the aforementioned reference is incorporated herein by reference for all purposes. Based upon the disclosure provided herein, one of ordinary skill in the art will recognize a variety of other media defect detectors or other types of detectors that may be used in place of media defect detector 361 in accordance with different embodiments of the present invention. Media defect detector circuit 361 provides a defect output 362 to a defect location circuit and buffer 363 and to a selector circuit 366. In some embodiments of the present invention, defect output 362 is asserted high when a defect is detected and asserted low at other times. Defect output 362 is provided to a selector circuit 366 and a defect location circuit and buffer 363.

During operation of data processing circuit 300, one or more calibration circuits are maintained static (i.e., adaptive updating of the calibration circuits is disabled) whenever samples corresponding to the period over which a media defect is indicated by assertion of defect output 362. In this way, changes to the outputs from the calibration circuits based upon data identified as potentially defective are reduced or eliminated. Because of the latency through media defect circuit 361, defect output 362 may assert after one or more samples corresponding to the identified defect have been processed. However, it can still be used to disable adaptive updating by calibration circuits during some samples corresponding to the identified defect. For this reason, during a first pass through a retry (i.e., re-read index 351 is '1'), selector circuit 366 selects defect output 362 as update enable signal 367.

Defect location circuit and buffer 363 is operable to record when a defect occurs relative to a received data set. As an example, assume a defect is found in the fiftieth through sixtieth samples of the received data set. In this case, defect location circuit and buffer 363 stores an indication that the fiftieth through sixtieth samples of the data set are suspect. Defect location circuit and buffer 363 is operable to assert a defect indicator 364 coincident with the processing of a corresponding data a portion of a data set corresponding to an earlier identified defect is found. Because the assertion of defect indicator 364 is based upon defect output 362 generated during processing a previous re-read of the data set, defect indicator 364 does not have the same latency concerns as defect output 362 and can be asserted exactly during the periods when the samples identified as being defective are being processed. Thus, for the second and later passes through a retry (i.e., re-read index 351 is '>1'), selector circuit 366 selects defect indicator 364 as update enable signal 367.

As previously stated, update enable signal 367 is provided to equalizer calibration circuit 323. Where update enable signal 367 indicates the occurrence of a defect, adaptive adjustment of filter coefficients 322 is disabled. Otherwise, adaptive adjustment is allowed. In addition, update enable signal 367 is provided to a noise predictive calibration circuit 368 and a noise predictive calibration circuit 375. Noise predictive calibration circuit 368 adaptively updates noise predictive filter taps 369 that are used to govern operation of data detector circuit 371. Noise predictive calibration circuit 368 may be any circuit known in the art that is capable of adaptively adjusting a control input to a data detector circuit. Similarly, noise predictive calibration circuit 375 adaptively updates noise predictive filter taps 376 that are used to govern operation of data detector circuit 330. Noise predictive calibration circuit 375 may be any circuit known in the art that is capable of adaptively adjusting a control input to a data detector circuit. Based upon the disclosure provided herein, one of ordinary skill in the art will recognize a variety of types of calibration that may be performed in relation to different embodiments of the present invention. Noise predictive calibration circuit 368 and noise predictive calibration circuit 375 each allow adaptive adjustment of the respective noise predictive filter taps 369 and noise predictive filter taps 376 based upon update enable signal 367. In particular, where update enable signal 367 indicates the occurrence of a defect, adaptive adjustment of noise predictive filter taps 369 and noise predictive filter taps 376 is disabled. Otherwise, adaptive adjustment is allowed.

Data detector circuit 371 is operable to apply a data detection algorithm to a data set received as processing output 398 from selector circuit 396. In some embodiments of the present invention, data detector circuit 371 is a Viterbi algorithm data detector circuit as are known in the art. In other embodiments of the present invention, data detector circuit 371 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention.

Upon completion of application of the data detection algorithm to the received data set on the first global iteration, data detector circuit 371 provides a detector output 373. Detector output 373 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 373 is provided to a local interleaver circuit 342. Local interleaver circuit 342 is operable to shuffle sub-portions (i.e., local chunks) of the data set included as detected output 373 and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once data decoder circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into multi-level data decoder circuit 399. Data decoder circuit 370 applies a data decoding algorithm to the received input to yield an interim decoded output 374. In some embodiments of the present invention, data decoder circuit 370 is a low density parity check decoder circuit as are known in the art. Based upon the disclosure provided herein, one of ordinary skill in the art will recognize a variety of data decoder circuits that may be used in relation to different embodiments of the present invention.

Where interim decoded output 374 fails to converge (i.e., fails to yield an originally written data set), it is determined whether another local iteration (i.e., another pass through data decoder circuit 370) is allowed. Where another local iteration is to be applied, interim decoded output 374 is provided as a feedback to low data decoder circuit 370. This continues until either a maximum number of local iterations is exceeded or interim decoded output 374 converges (i.e., yields the originally written data set). Where data decoder circuit 370 is a low density parity check decoder circuit, such convergence of interim decoded output 374 is found where all of the parity check equations applied as part of the data decoding algorithm are satisfied.

Where interim decoded output 374 fails to converge and a number of local iterations through data decoder circuit 370 exceeds a threshold, the resulting interim decoded output is provided as a decoded output 354 back to central memory circuit 350 where it is stored awaiting another global iteration through a data detector circuit included in data detector circuit 330. Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a data set received as processing output 398 from selector circuit 396. In some embodiments of the present invention, data detector circuit 330 is a Viterbi algorithm data detector circuit as are known in the art. In other embodiments of the present invention, data detector circuit 330 is a maximum a posteriori data detector circuit as are known in the art. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where interim decoded output 374 converges it is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order, with the originally ordered data sets being provided as a data output 392.

Using such a data processing system, adaptive updating of one or more calibration circuits used in the data processing circuit are disabled when data with a significant probability of inaccuracies are received. By temporarily disabling the calibration circuits, the adaptive updating performed by the calibration circuits is not skewed by the likely inaccurate data. Of note, disabling process is described as being base upon detection of a media defect. In other embodiments of the present invention, different indicators of flawed data samples may be used to drive defect output 362.

Figure 4A:
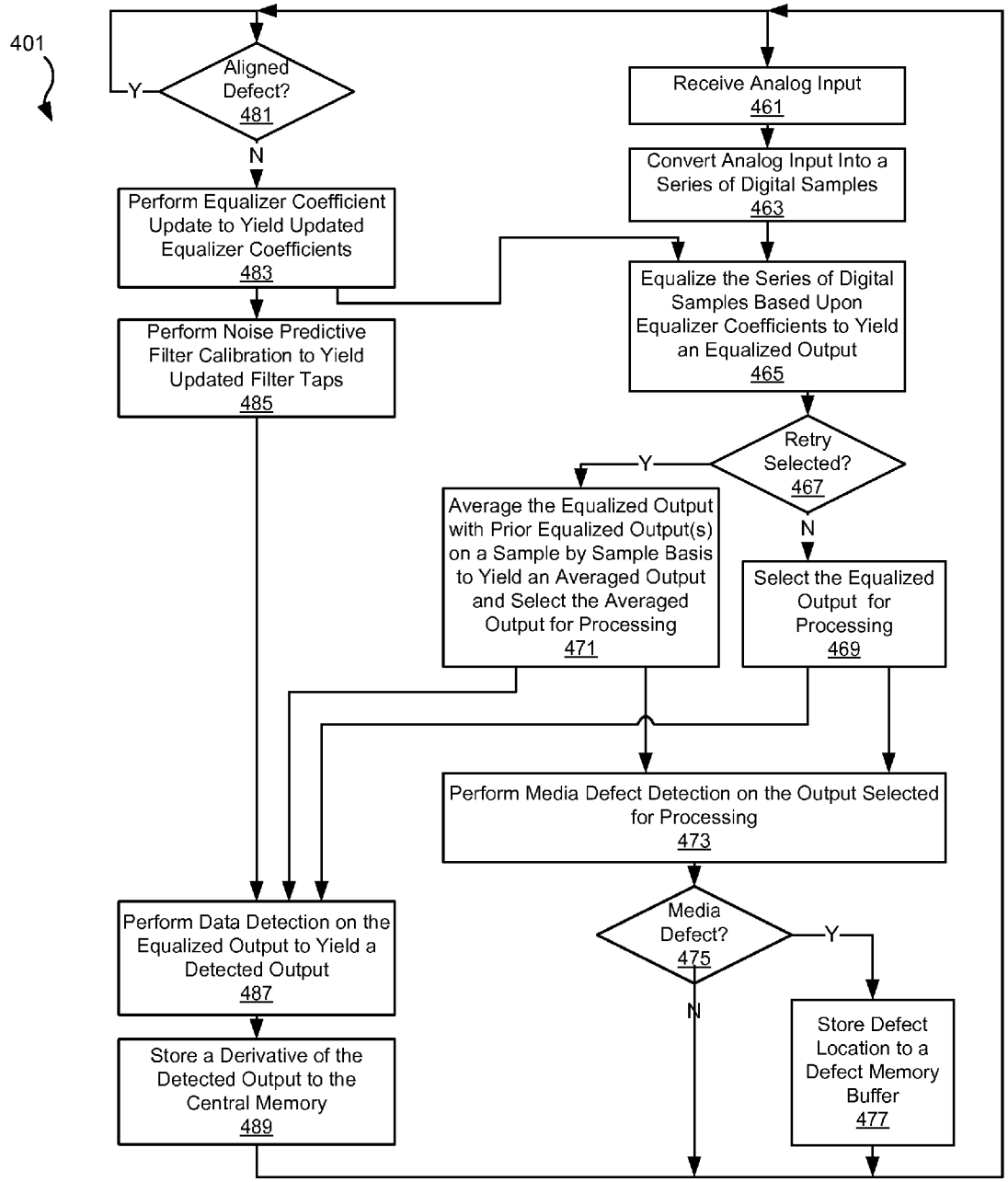
FIGS. 4a-4b are flow diagrams showing a method for data processing utilizing including media defect based loop coasting in accordance with some embodiments of the present invention.
Figure 4B:
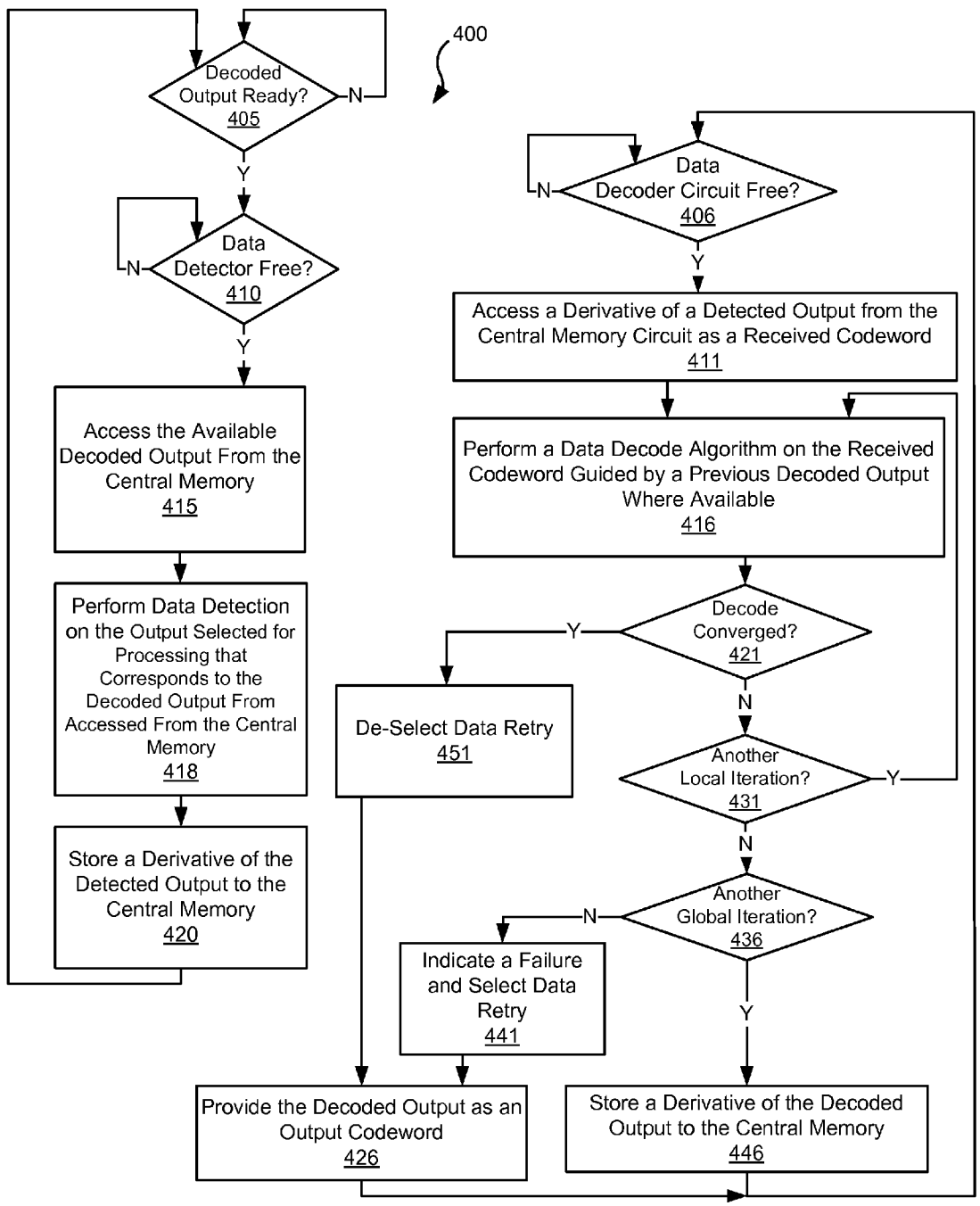

Turning to FIGS. 4a-4b, flow diagrams 400, 401 show a method for data processing utilizing including media defect based loop coasting in accordance with some embodiments of the present invention. Following flow diagram 401 of FIG. 4a, an analog input is received (block 461) and converted to a series of corresponding digital samples (block 463). The analog input may be derived, for example, from a storage medium or a transfer medium. Based upon the disclosure provided herein, one of ordinary skill in the art will recognize a variety of sources from which the analog input may be derived. The digital samples are equalized based at least in part on equalizer coefficients to yield an equalized output (block 465). As more fully described below, these equalizer coefficients are adaptively adjusted to improve operation of the data processing. The adaptive updating is disabled where data inaccuracies are probable to avoid skewing the adaptation due to the inaccurate data.

It is determined whether a retry is selected (block 467). As additionally discussed below, a retry is selected where a data processing fails to yield an originally written data set during standard processing conditions. Where such a retry is triggered, the analog input corresponding to the received data set may be accessed anew by, for example, reading a storage medium where the information is stored or by re-accessing the equalized output that was buffered for later possible re-processing. Where a retry is not selected (block 467), the equalized output is selected for processing (block 469). Alternatively, where a retry is selected (block 467), the equalized output is averages with a prior version of the equalized output on a sample by sample basis to yield an averaged output, and this averaged output is selected for processing (block 471).

A media defect detection is performed on the output selected for processing (block 473). This media defect detection may be tailored, for example, to detect samples within the equalized output that were derived from an area of a storage medium that may be defective. Any media defect detection process known in the art may be used. It should be noted that while FIGS. 4a-4b are described specifically in relation to a media defect, other types of defects in the data may be monitored and used to control operation in accordance with other embodiments of the present invention. Hence, the present inventions may provide for limiting or disabling calibration processes based upon a determination that one or more samples exhibit a higher probability of being inaccurate.

It is determined whether the sample from the output selected for processing corresponds to a media defect (or other type of defect) (block 475). Where the sample corresponds to a defect (block 475), a location of the defect is stored to a memory (block 477). This location may be, for example, an index from the beginning of a data set represented by the equalized output. As a particular example, assume a defect is found in the fiftieth through sixtieth samples of the equalized output. In this case, location would indicate that the fiftieth to sixtieth samples have a high probability of being inaccurate. This index information is used during re-processing (i.e., a retry process) to disable updating by calibration processes.

In addition, a data detection algorithm is applied to the output selected for processing to yield a detected output (block 487). This data detection process is guided by one or more filter taps. As more fully described below, these filter taps are adaptively adjusted to improve operation of the data processing. The adaptive updating is disabled where data inaccuracies are probable to avoid skewing the adaptation due to the inaccurate data. The data detection algorithm may be, but is not limited to, a Viterbi algorithm or a maximum a posteriori data detection. Based upon the disclosure provided herein, one of ordinary skill in the art will recognize a variety of data detection algorithms that may be used in relation to different embodiments of the present invention. A derivative of the detected output is stored to a central memory (block 489). The derivative of the detected output may be, for example, an interleaved or shuffled version of the detected output.

In parallel to applying the equalization (block 465), it is determined whether the next sample to be provided as part of the equalized output corresponds to a defect (block 481). In particular, the index information from a previous processing pass (i.e., a previous retry) through the same data set indicating a location of a defect (i.e., block 477) is used during re-processing of the data. Where the next sample of the equalized output does not correspond to a defect (block 481), the next sample is used to perform equalizer coefficient updating (block 483) and noise predictive filter calibration (block 485). The result from the equalizer coefficient updating (block 483) is used by the equalization process (block 465), and the result form the noise predictive filter calibration (block 485) is used in applying the data detection algorithm (block 487). Any calibration processes for adaptively updating equalizer coefficients or adaptively updating noise predictive filter taps may be used in accordance with embodiments of the present invention. In contrast, where the next sample of the equalized output corresponds to a defect (block 481), equalizer coefficient updating (block 483) and noise predictive filter calibration (block 485) are skipped for the current sample and the previously available values are used. By temporarily disabling adaptive updates of noise predictive filter taps (block 485) and equalizer coefficients (block 483) using samples corresponding to defects (i.e., samples with a probability of inaccuracies), the adaptive updating performed by the calibration processes is not skewed by the likely inaccurate data.

Following flow diagram 400 of FIG. 4b, it is determined whether a decoded output is ready in the central memory for use in re-application of the data detection algorithm (block 405). Such a decoded output, as is more fully described below, is stored to the central memory after application of a data decode algorithm to an earlier detected output by a data decoder circuit is complete. Where a decoded output is ready (block 405), it is determined whether a data detector circuit is available to process the data set (block 410).

Where the data detector circuit is available for processing (block 410), the decoded output is accessed from the central memory (block 415), and the data detection algorithm is re-applied to the output selected for processing guided by the corresponding decoded output accessed from the central memory (block 418). Again, the data detection algorithm may be, but is not limited to, a Viterbi algorithm data detector circuit or a maximum a posteriori data detector circuit. Application of the data detection algorithm yields a detected output. A derivative of the detected output is stored to the central memory (block 420). The derivative of the detected output may be, for example, an interleaved or shuffled version of the detected output.

In parallel to the previously described data detection process, it is determined whether a data decoder circuit is available (block 406). The data decoder circuit may be, for example, a low density data decoder circuit as are known in the art. Where the data decoder circuit is available (block 406), a previously stored derivative of a detected output is accessed from the central memory and used as a received codeword (block 411). A data decode algorithm is applied to the received codeword to yield a decoded output (block 416). It is then determined whether the decoded output converged (e.g., resulted in the originally written data as indicated by the lack of remaining unsatisfied checks) (block 421). Where the decoded output converged (block 421), any previous selection of the retry process (if any) is de-selected (block 451). This de-selection of the retry process impacts block 467 of flow diagram 401 of FIG. 4a. In addition, the converged codeword is provided as a decoded output (block 426).

Alternatively, where the decoded output failed to converge (e.g., errors remain) (block 421), it is determined whether another local iteration is desired (block 431). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 431), the data decode algorithm is re-applied using the current decoded output as a guide (block 416).

Alternatively, where another local iteration is not desired (block 431), it is determined whether another global iteration is allowed (block 436). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 436), a derivative of the decoded output is stored to the central memory (block 446). The derivative of the decoded output being stored to the central memory triggers the data set ready query of block 405 to begin the data detection process. Alternatively, where another global iteration is not allowed (block 436), a failure to converge is indicated (block 441), and the current decoded output is provided (block 426).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing where one or more calibration processes may be suspended or coasted based upon determination of a defective data input. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a defect detector circuit operable to identify a defect region during a first pass processing of a received data set;
   a defect location buffer operable to maintain an indication of the defect region in the received data set;
   a calibration circuit operable to adaptively update a calibration output during a second pass processing of the received data set, wherein updating the calibration output is disabled for one or more samples of the received data set corresponding to the indication of the defect region; and
   a data detector circuit operable to apply a data detection algorithm based at least in part on the calibration output to a detector input derived from the received data set during the first pass processing of the received data set to yield a detected output.

2. The data processing system of claim 1, wherein the data detector circuit is further operable to:
   apply the data detection algorithm based at least in part on the calibration output to the detector input derived from the received data set during the second pass processing of the received data set to yield a second detected output.

3. The data processing system of claim 2, wherein the data detector circuit includes a noise predictive filter, and wherein the calibration output is a filter tap used by the noise predictive filter.

4. The data processing circuit of claim 2, wherein the data detector circuit is selected from a group consisting of: a maximum a posteriori data detector circuit, and a Viterbi algorithm data detector circuit.

5. The data processing system of claim 2, the data processing system further comprising:
   an equalizer circuit operable to:
   equalize an equalizer input derived from the received data set during a first pass processing of the received data set to yield a first equalized output;
   equalize an equalizer input derived from the received data set during a second pass processing of the received data set to yield a second equalized output; and
   wherein the equalizing is based at least in part on the calibration output.

6. The data processing system of claim 5, wherein the equalizer circuit is a digital finite impulse response filter circuit, and wherein the calibration output is a filter coefficient used by the digital finite impulse response filter.

7. The data processing system of claim 1, wherein:
   the first pass processing of the received data set uses a first data set derived from reading a location on a storage medium; and
   the second pass processing of the data set uses a second data set derived from reading the location of the storage medium.

8. The data processing system of claim 1, wherein:
   the first pass processing of the received data set uses a transferred data set received via a transmission medium and stored as a stored data set to a buffer; and
   the second pass processing of the data set uses the stored data set.

9. The data processing system of claim 1, wherein the system is implemented as an integrated circuit.

10. The data processing system of claim 1, wherein the data processing system is incorporated in a device selected from a group consisting of: a storage device, and a data communication device.

11. The data processing system of claim 1, the defect detector circuit is a media defect detector circuit, and wherein the defect region corresponds to a defective portion of a medium from which the received data set is derived.

12. A method for data processing the method comprising:
    providing a media defect detector circuit;
    accessing a data set from a source to yield an accessed data set, wherein the source is a storage medium;
    updating a calibration output using a calibration circuit based on at least a portion of a series of samples derived from the accessed data set;
    using the media defect detector circuit to detect a portion of the accessed data set that exhibits a probability of inaccuracy, wherein the portion of the accessed data set that exhibits the probability of inaccuracy corresponds to a defective region on the storage medium;
    storing an indication of the probability of inaccuracy;
    re-accessing the data set from the source to yield a re-accessed data set; and
    updating the calibration output using a calibration circuit based on at least a portion of a series of samples derived from the re-accessed data set, wherein updating the calibration output is disabled for one or more samples of the re-accessed data set corresponding to the indication of the probability of inaccuracy.

13. The method of claim 12, wherein the method further comprises:
    applying a data detection algorithm to a detector input derived from the accessed data set to yield a first detected output;
    applying the data detection algorithm to a detector input derived from the re-accessed data set to yield a second detected output; and
    wherein applying the data detection algorithm is based at least in part on the calibration output.

14. The method of claim 13, wherein the data detector circuit includes a noise predictive filter, and wherein the calibration output is a filter tap used by the noise predictive filter.

15. The method of claim 13, wherein the data detector circuit is selected from a group consisting of: a maximum a posteriori data detector circuit, and a Viterbi algorithm data detector circuit.

16. The method of claim 13, wherein the method further comprises:
   equalizing an equalizer input derived from the accessed data set to yield a first equalized output, wherein the detector input derived from the accessed data set is derived from the first equalized output;
   equalizing an equalizer input derived from the re-accessed data set to yield a second equalized output, wherein the detector input derived from the accessed data set is derived from a combination of the first equalized output and the second equalized output; and
   wherein the equalizing is based at least in part on the calibration output.

17. The method of claim 16, wherein the equalizer circuit is a digital finite impulse response filter circuit, and wherein the calibration output is a filter coefficient used by the digital finite impulse response filter.

18. A storage device, the storage device comprising:
   a storage medium;
   a head assembly disposed in relation to the storage medium and operable to provide an input signal corresponding to information on the storage medium;
   a data processing circuit including:
      a front end processing circuit operable to process the input signal to yield a first data set from a location on the storage medium and to yield a second data set from the same location, wherein the second data set is a re-accessed version of the first data set;
      a media defect detector circuit operable to identify a defective region on the storage medium based upon the first data set;
      a defect location buffer operable to maintain an indication of a probability of inaccuracy in a portion of the first data set corresponding to the defective region on the storage medium;
      a calibration circuit operable to adaptively update a first calibration output and a second calibration output using the second data set, wherein updating the first calibration output and the second calibration output is disabled for one or more samples of the second data set corresponding to the indication of a probability of inaccuracy; and
      an equalizer circuit operable to equalize an equalizer input derived from the first data set to yield a first equalized output, wherein the equalizing is based at least in part on the first calibration output.

19. The storage device of claim 18, the storage device further comprising:
   a data detector circuit operable to:
      apply a data detection algorithm to a detector input derived from the first equalized output to yield a first detected output;
      apply the data detection algorithm to a detector input derived from a combination of the first equalized output and the second equalized output to yield a second detected output; and
      wherein applying the data detection algorithm is based at least in part on the second calibration output.

* * * * *